(12) United States Patent
Thomasson et al.

(10) Patent No.: US 10,887,192 B2
(45) Date of Patent: Jan. 5, 2021

(54) TARGETED NETWORK DISCOVERY AND VISUALIZATIONS

(71) Applicant: Red Hat, Inc., Raleigh, NC (US)

(72) Inventors: Benjamin Thomasson, Durham, NC (US); Peter Sprygada, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 113 days.

(21) Appl. No.: 16/054,629

(22) Filed: Aug. 3, 2018

(65) Prior Publication Data
US 2020/0044940 A1 Feb. 6, 2020

(51) Int. Cl.
*H04L 12/24* (2006.01)
*H04L 12/733* (2013.01)
*H04L 29/12* (2006.01)

(52) U.S. Cl.
CPC ............ *H04L 41/22* (2013.01); *H04L 41/085* (2013.01); *H04L 41/12* (2013.01); *H04L 45/20* (2013.01); *H04L 61/6022* (2013.01)

(58) Field of Classification Search
CPC ....... H04L 41/22; H04L 41/085; H04L 41/12; H04L 61/6022; H04L 45/20; H04L 61/103
USPC ......................................................... 715/736
See application file for complete search history.

(56) References Cited

U.S. PATENT DOCUMENTS

| | | | | |
|---|---|---|---|---|
| 8,045,486 B2* | 10/2011 | Swan | ...................... | H04L 41/12 370/255 |
| 8,386,593 B1 | 2/2013 | Gao et al. | | |
| 8,701,102 B2 | 4/2014 | Appiah et al. | | |
| 2002/0113816 A1* | 8/2002 | Mitchell | ............... | G06F 3/0481 715/734 |

FOREIGN PATENT DOCUMENTS

| | | |
|---|---|---|
| CN | 106681956 | 5/2017 |
| WO | WO2017217988 | 12/2017 |

OTHER PUBLICATIONS

Ansible; "Use Case: Configuration Management," https://www.ansible.com/use-cases/configuration-management, 2017, 8 pages.
(Continued)

*Primary Examiner* — Andrey Belousov
(74) *Attorney, Agent, or Firm* — Lowenstein Sandler LLP

(57) ABSTRACT

Systems and methods for generating a graphical user interface representation of a network topology using discovery parameters. An example method includes receiving, from a client, user input requesting the graphical user interface representation of the network topology. Discovery parameters for discovering a plurality of nodes in the network may be determined from the user input. First network configuration information may be retrieved from the first node determined from discovery parameters. The configuration information may describe a first subset of the plurality of nodes connected to the first node. A second node may be identified from the first subset. Second network configuration information may be retrieved from the second node, which describes a second subset of the plurality of nodes connected to the second node. The graphical user interface representation may be generated from the network configuration information.

17 Claims, 6 Drawing Sheets

(56) References Cited

OTHER PUBLICATIONS

Garros, Damien, "Building Cloud Virtual Topologies with Ravello and Ansible," https://www.slideshare.net/dgarros/building-cloud-virtual-topologies-with-ravello-and-ansible, Feb. 13, 2017, 32 pages.

Oswalt, Matt, "Spine/Leaf Topology Explorer with Ansible," https://keepingitclassless.net/2014/06/spine-leaf-topology-ansible/, Jun. 30, 2014, 9 pages.

Sandobalín et al., "End-to-End Automation in Cloud Infrastructure Provisioning," 26th International Conference on Information Systems Development, Sep. 2017, 13 pages.

* cited by examiner

TARGETED NETWORK DISCOVERY AND VISUALIZATIONS

TECHNICAL FIELD

The present disclosure is generally related to discovery of network configuration values for networked devices, and is more specifically related to a targeted discovery of specific network devices in a network and visualization of the network using discovery parameters.

BACKGROUND

Data centers may include networked devices within a defined network. The networked devices are each configured based on specific network configurations in order to communicate with each other and provide a distributed service. Configuration options of the networked devices should agree with each other in order to provide adequate service. Mistakes in configuration properties of networked devices may lead to errors and data traffic may flow in unexpected and undesirable ways.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
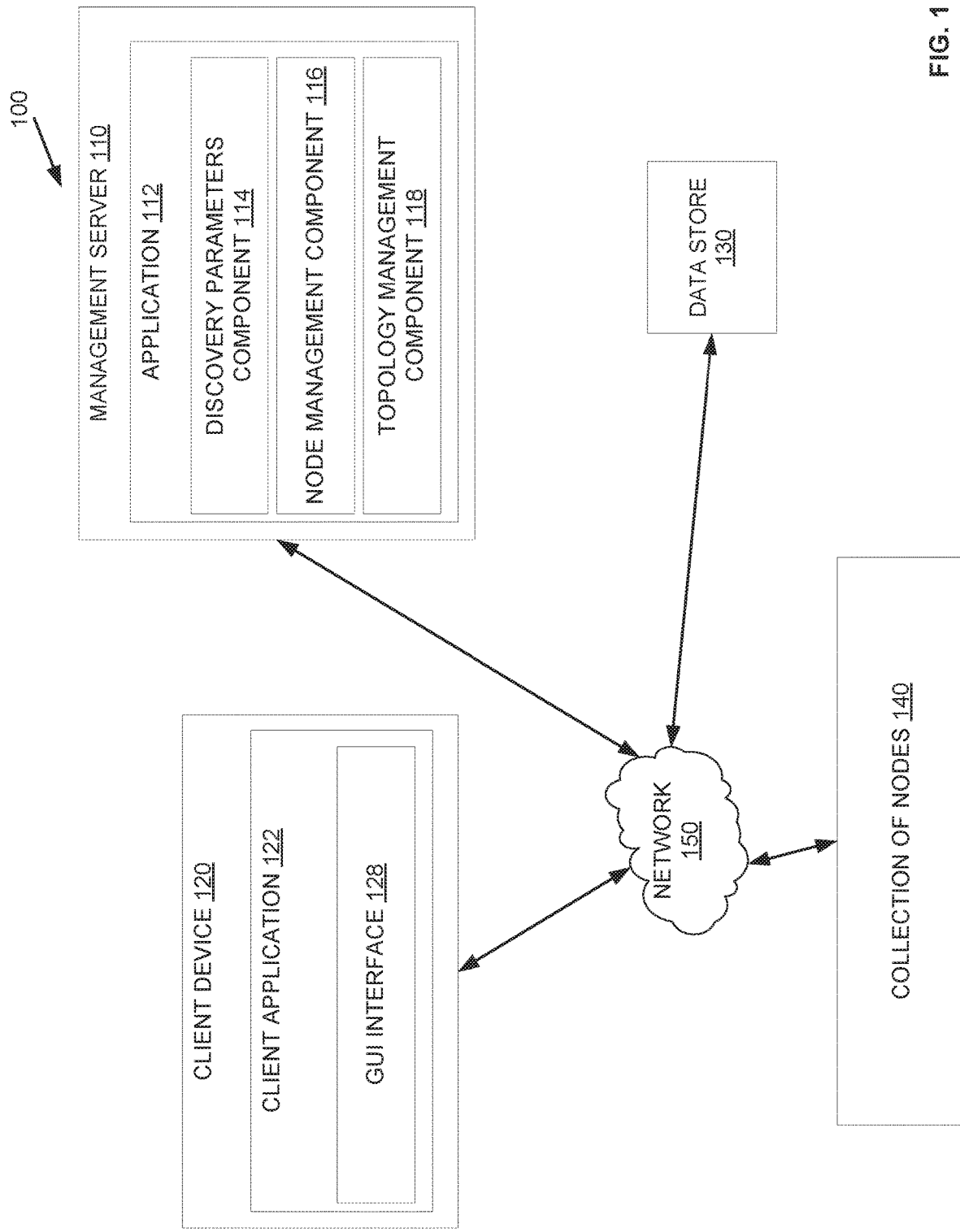
FIG. 1 depicts a high-level diagram of an example system architecture operating in accordance with one or more aspects of the present disclosure.

Described herein are system and methods for generating a graphical user interface representation of a topology of a network that includes nodes selectively discovered based upon discovery parameter input. The graphical user interface (GUI) representation of the topology of the network may include visual indicators identifying nodes that share common network configuration values.

In an illustrative example, a network may include a set of nodes (networked devices). A networked device may represent any computing device configured to communicate with other devices through a network connection. Examples of networked devices include, but are not limited to, server computers, client computers, routers, switches, Ethernet hubs, bridges, repeaters, or any other computing device capable of connecting and communicating over a network. Generating a visual representation of a network topology is a tedious process that may be susceptible to errors that may lead to configuration mistakes when updating the networking service. In order for an engineer to successfully configure nodes in the network, the engineer needs to make sure that configuration values between the nodes are correct in order to ensure accurate representation of communication between devices. How nodes are connected may determine which values should match in order to provide distributed services throughout the network. If for example, layer 2 virtual local area network (VLAN) configurations are not accurate then the configuration of networking traffic flow within the VLAN may cause errors in unexpected and undesirable ways.

Conventionally, network engineers may use a spreadsheet to keep track of configurations values for nodes. However, as network systems become larger and more complex, manually maintaining spreadsheets may become too complex and may lead to errors in reading and/or translating the spreadsheet when configuring nodes. User interfaces have been developed to aid network engineers by providing a visual representation of the network including configuration values for nodes based on their spreadsheets. However, visual interfaces that are based on configuration spreadsheets will still suffer from potential errors related to configuration mistakes made within the spreadsheets.

Network discovery applications may help to reduce errors related to configuration mistakes within spreadsheets by discovering configuration values from nodes within the network. However, if a network includes hundreds or even thousands of nodes then discovery of configuration values of each node may require extensive processing resources and time. Additionally, displaying discovered configuration values for a large number of nodes may result in a user interface that displays too many configuration values for nodes and as a result is difficult to read by a network engineer. User interfaces for the network may be configured to display only a limited amount of configuration information for each node. However when troubleshooting a network issue, if the display only displays a limited amount of data for each node, then the display may not convey to the network engineer any potential configuration mismatches that may be causing the network issue. Therefore a GUI representation of the network topology that displays a requested level of detail is desirable.

Accordingly, aspects of the present disclosure address the above and other deficiencies by generating a GUI representation of a portion of the network and providing visual indicators that indicate configuration values for enabled network services and/or network protocols for discovered nodes within the portion of the network displayed. Aspects of the present disclosure include performing a selective discovery of a set of nodes determined from discovery parameters provided by a user. Discovery parameters may define a node of interest from which network discovery is to be initiated. By defining the node of interest, the system may ensure that node discovery begins at the node of interest and targets neighboring nodes to the node of interest.

In an implementation, discovery parameters may specify discovery of nodes based on device type. For example, if the discovery parameters specify that only nodes that are routers are to be discovered, then devices such as servers, end-user computers, switches, and hubs may be omitted from a GUI representation of the targeted discovery. The discovery process may use less computing resources by omitting discovery of devices that the engineer is not interested in viewing.

In an implementation, the discovery parameters may define discovering nodes based on their assigned function. For instance, the engineer may be interested in viewing a network topology of routers assigned to function as core routers. A core router is a router configured to route bulk traffic between other routers. In contrast, an edge router is a router configured to connect end user devices, such as laptops, desktops, or servers, to the network. By targeting discovery of nodes that are assigned a specific function, the discovery process may consume less processing resources that would otherwise be used to discover types of devices not specifically requested for discovery.

In an implementation, the discovery parameters may define a maximum hop count from a starting node. The starting node may represent the first node discovered during the discovery process. A hop is defined as a portion of a path between a starting node and a destination node. When sending network packets from a starting node to a destination node, the packets may pass through a series of intermediate nodes before reaching the destination node. Each time a packet passes through an intermediate node, a hop is identified. A hop count refers to the number of intermediate nodes through which data will pass between the starting node and the destination node. In this context, discovery parameters may define a maximum hop count for discovery. The maximum hop count may refer to the number of neighboring nodes along a network path that may be discovered before the discovery process terminates. If the discovery parameters specify a hop count of two, then the discovery process may discover directly neighboring nodes from the starting node (first hop) and may discover additional nodes that directly neighbor the nodes that neighbor the starting node (second hop). For example, if the discovery parameters specify a maximum hop count of two and a starting node, labeled node A, then the discovery process may discover a first set of nodes (nodes B, C, and D) that directly neighbor node A, as the $1^{st}$ hop. The discovery process may then discover a second set of nodes (node X, Y, Z) that directly neighbor node B, as the $2^{nd}$ hop with respect to node A. The maximum hop count in discovery parameters may be used to limit discovery to a set of neighboring nodes that are within a specified number of hops.

A management server may perform discovery of one or more nodes in the network using the specified discovery parameters. In an implementation, a management server may receive a discovery request, including discovery parameters, from a user of a user device and may connect to one or more nodes to retrieve configuration values from the one or more nodes based upon the discovery parameters. For example, the management server may receive a discovery request that defines a starting node from which discovery is to be initiated. The management server may identify the starting node from the discovery parameters and may establish a connection to the starting node. For instance, the management server may establish a secure socket shell (SSH) connection to the starting node. Upon establishing the connection between the management server and the starting node, the management server may retrieve network configuration information that may describe physical connections between the starting node and one or more directly neighboring nodes, enabled network services and protocols on the starting node, and network routing information for the enabled services/protocols.

In an implementation, the management server may retrieve physical connection information describing physical connections between the starting node, referred to as the first node, and directly neighboring nodes. For example, physical connection information may include communication endpoint identifiers such as IPv4 and IPv6 addresses, media access control address (MAC) identifiers, or any other network identifier used to identify directly neighboring nodes. Upon establishing a connection between the management server and the first node, the management server may execute a link layer discovery protocol (LLDP) neighbor command on the first node, such as "show lldp neighbors detail" to retrieve information about directly neighboring nodes. The output of the LLDP neighbor command may include neighboring node information such as, network address, device name, port connection information, among others. In another example, the management server may execute an address resolution protocol (ARP) command to retrieve reachable network addresses for neighboring nodes. For instance, the management server may connect to the first node via SSH and may execute on the first node a "show interfaces" command to discover which network addresses for devices are directly connected to interfaces of the first node. The management server may then execute an ICMP scan on the discovered network addresses to determine which network addresses map to live devices. The management server may then execute on the first node a show ARP command, such as "show arp|no-match incomplete" to return a list of reachable network addresses for neighboring nodes from the ARP table. The neighboring node information may then be used to establish connections to the neighboring nodes in order to discover network configuration information for the neighboring nodes as well as determining additional nodes to discover that are within the maximum hop count specified by the discovery parameters.

In an implementation, the management server may retrieve network configuration information that specifies enabled network services and network protocols for the first node and neighboring nodes. For example, upon establishing a connection between the management server and the first node, the management server may retrieve static configuration information from the first node that defines configuration values of installed network services. Retrieving static network configuration information may include accessing a configuration file from a network router. The startup-config file may define settings for configuring enabled network protocols for the first node upon startup. In another example, the management server may retrieve ephemeral state information that may describe routes between nodes that network traffic may follow. For example, the management server may execute commands on the first node to query a Routing Information Base (RIB) or a routing table in order to retrieve network paths for routing protocols such as Open Shortest Path First (OSPF) or Border Gateway Protocol (BGP). Network paths may include lists of routes to particular network destinations.

In an implementation, the management server may be configured to identify, from the network configuration information retrieved from the first node, property values of one or more neighboring nodes that match the discovery parameters. For example, the network configuration information retrieved from the first node may indicate a set of neighboring nodes that includes switch-1, switch-2, and server-1. The discovery parameters may specify that only switches are to be discovered. As a result, the management server may identify switch-1 and switch-2 as nodes of interest and may establish connections to switch-1 and switch-2 to discover their respective network configuration values. For example, the management server may establish an SSH connection to switch-1 and retrieve network configuration information from switch-1. The network configuration information from switch-1 may include configuration information for identifying nodes that neighbor switch-1. The management server may then identify, from the network configuration information retrieved from switch-1, any additional nodes that match the discover parameters. If additional nodes match the discovery parameters, then management server may establish connections to the additional nodes and retrieve additional network configuration information from the additional nodes.

In an implementation, the management server may store information about discovered nodes and their respective network configuration information in an attached data store. The management server may identify relationships, based upon common configuration values, between discovered nodes using the stored network configuration information and may generate a graphical representation of a portion of the network that includes the discovered nodes. The management server may cache the network configuration information within the data store. Cached network configuration information may then be retrieved at a later time by the management server for identifying relationships between nodes and generating the graphical representation of the portion of the network. Cached network configuration information may be deleted after a period of time as the network configuration information, such as ephemeral state information, may change and the cached data may become out of date after a period.

In an implementation, the discovery steps of retrieving network configuration information and identifying configuration values of neighboring nodes that match the discovery parameters may be repeated for each node identified that satisfies the discovery parameters until there are no new nodes to be discovered. For example, the discovery parameters may specify a maximum hop count, which defines the number of hops from the starting node to be discovered. The management server may cease discovery of neighboring nodes once the maximum number of hops from the first node has been satisfied. In another example the management server cease discovery of neighboring nodes when network configuration information retrieved from a node does not include any previously unidentified nodes. For instance, if neighboring nodes identified, from the network configuration information, are nodes that have already been identified or do not match the discovery parameters then the management server may cease discovery of nodes.

In an implementation, the management server may identify relationships between discovered nodes based upon configuration values that are common between the discovered nodes. For example, the management server may identify a subset of nodes that belong to the same LAN based upon their IP addresses and netmask. In other examples nodes having the same VLAN ID may be identified as being part of a subset of nodes. In yet another example, the management server may identify a subset of nodes that support Open Shortest Path First (OSPF) protocol based upon network configuration information retrieved from each of the nodes in the set of discovered nodes. For instance, during discovery the management server may execute a "show ip ospf data" command on a node to determine neighboring nodes and their corresponding OSPF area. The management server may identify a subset of nodes that belong to a particular OSPF area. The management server may identify one or more subsets of nodes based upon one or more network configuration values.

In an implementation, the management server may generate a graphical user interface (GUI) representation of a network topology that includes the set of discovered nodes. The GUI representation of the network topology may comprise the set of discovered nodes, interconnectivity between each of the discovered nodes based on configuration information, and visual features that represent common network configuration values for the identified subset of nodes. The GUI representation may include displays of network configuration information for the discovered nodes. For instance, the GUI representation may display IP addresses under each node icon. Additionally, each node may be displayed as a specific icon that may represent the type of device or function assigned to the node. For example, a node that is a server may be displayed using an icon that looks like a server. Whereas a node that represents a router may by displayed using a different icon that looks like a router. In other examples, icons may be specific to the type of function assigned to the node, such as a core router may have a specific icon that is distinct from the icon that represents an edge router. This distinction may be based on shape, color, or text that is displayed within or directly next to the icon.

In an implementation, the GUI representation of the network topology may include a data structure, such as XML or any other conventional data model, that includes elements representing each of the discovered nodes and attributes representing network configuration properties for each discovered node. The management server may send the GUI representation of the network topology to the client device for display. The client device may represent any end-user computing device, such as a desktop, laptop, tablet, or smartphone, capable of receiving and displaying the GUI representation on a display. The client device may be configured to receive user input for manipulating the GUI representation displayed. In an implementation, the client device may be configured with an interactive GUI display that displays the GUI representation of the network topology and display options for manipulating the displayed representation. The display options may include display filters configured to show or hide configuration information on the network topology. For example, display filters may include filters to show or hide connection lines between nodes at the physical and/or data link layer, groups of nodes that are part of a network layer based on Routing Information protocol (RIP) or OSPF, or configuration information such as IP addresses assigned to each of the nodes.

In an implementation, network configuration values for each discovered node may be categorized based upon a specific Open Systems Interconnection (OSI) layer. For instance, nodes that have subnet addresses associated with an OSI layer 2 VLAN may be annotated as an OSI layer 2 VLAN. The client device GUI may be configured with display filters that may toggle display of configuration values associated with a particular OSI layer.

The client device may be configured to receive user input that updates the discovery parameters for the purpose of requesting an updated GUI representation from the management server. User input may include changes to the view of the GUI representation, such as zooming in or out, panning left or right, or scrolling vertically. In an implementation, the client device may receive the user input to manipulate the display of the GUI representation and may transmit the user input to the management server in order to update the set of nodes displayed within the GUI representation. The management server may receive the user input and may determine updated discovery parameters based upon the user input.

In an implementation, the management server may determine updated discovery parameters including, but not limited to, an updated first node, an updated hop distance, and/or updated device types and device functions from the user input received from the client device. For example, if the user input indicates panning the view to the right, the management server may determine a third node for discovery based upon a node that is closest to the center of the GUI display on the client device after the user input. In another example, the client device may be configured to determine which node is closest to the center and may specify the third node in the user input sent to the management server. Upon determining the updated first node (starting node), the management server may initiate updated discovery of nodes starting at the updated first node.

In an implementation, the management server may determine an updated hop distance for node discovery using the user input. For example, if the user input indicates that the user zoomed out, then the management server may determine that the hop distance for discovering additional neighboring nodes has increased from two hops to three hops, where two hops were used to discover nodes for the currently presented GUI representation of the network topology. The hop distance may be determined from a change in zoom value. For instance, the user input may indicate a change in zoom, either zooming in by a certain amount or zooming out by a certain amount, which may be used by the management server to determine whether to update the hop distance value from the previously used hop distance value used to generate the currently presented GUI representation.

In an implementation, the management server may use changes in zoom level from the user input to update the amount of detail displayed within the GUI representation of the network topology for each node. For example, if the user input indicates that the zoom level is fully zoomed out, then the management server may be configured to display, within the GUI representation, node details such as device names and device types for physical layer details and higher level network protocol details such as, OSPF area numbers or Border Gateway Protocol (BGP) autonomous system numbers. If the user input indicates a partially zoomed in level then the management server may be configured to display physical layer details such as LLDP links and interface names for interfaces on nodes, data link layer details such as enabled link layer protocols and VLANs enabled on links and interfaces, and network layer details such as interface IP addresses and OSPF/BGP adjacency states. If the user input indicates a fully zoomed in level then the management server may be configured to display physical level details including the physical types (electrical, optical, or wireless) of links and interfaces, hardware part numbers for nodes, hardware status, and transmission modes for each link. Data link layer details that may be displayed by the management server when fully zoomed in may include frame counters, framer counters for each VLAN, and MAC table entries. Network layer details that may be displayed by the management server when fully zoomed in may include routing table entries and access control lists.

In an implementation, the management server may identify a third node from the updated discovery parameters in the user input received from the client device. The management server may then retrieve network configuration information from the third node. In an implementation, the management server may be configured to check the data store for cached network configuration information associated with the third node. For example, if configuration information was previously retrieved from the third node and stored in the data store during the previous round of discovery, then the management server may access the cached network configuration information for the purpose of generating an updated GUI representation of the network topology. As described, cached network configuration information may be valid for a limited amount of time. If the management server determines that the data store does not contain network configuration information for the third node or that the cached network configuration information is out of date, then the management server may retrieve the network configuration information from the third node by establishing a connection to the third node to retrieve the network configuration information.

In an implementation, the management server may retrieve network configuration information from neighboring nodes of the third node in the same manner as described above. The management server may retrieve network configuration information from a set of discovered nodes defined by the discovery parameters. The management server may then identify from the set of discovered nodes, a subset of nodes that have one or more common network configuration values, such as belonging to a common VLAN or supporting OSPF or BGP protocols. The management server may generate an updated GUI representation of the network topology that represents the set of discovered nodes based upon discovery parameters updated by the received user input. In an implementation, the management server may send the updated GUI representation to the client device for display.

Accordingly, aspects of the present disclosure may significantly reduce processing time and computing resources used during network discovery by selectively discovering network configuration values for nodes that match provided discovery parameters. Additionally, configuration errors attributed to manually maintained network configurations of nodes or attributed to network topology displays that are either too detailed or not detailed enough, may be reduced by generating a GUI representation of a portion of the network topology that is based upon the provided discovery parameters. Network downtimes may be reduced by providing accurate configuration information within a network topology display. By selectively displaying desired nodes and their property values, network devices may remain online during configuration updates, thereby increasing network availability and reliability.

FIG. 1 illustrates an example system architecture 100 in which implementations of the disclosure may operate. The system architecture 100 may include management server 110, client device 120, data store 130, and a collection of nodes 140. Each of the management server 110, the client device 120, the data store 130, and the collection of nodes 140 are communicatively coupled via network 150. Although one client device 120 is shown, it should be understood that any suitable number of client devices may be included in the system architecture 100 and the other client devices may include similar components and features as client device 120. The network 150 may be a public network (e.g., the Internet), a private network (e.g., a LAN of wide area network (WAN)), or a combination thereof. Network 150 may include a wireless infrastructure, which may be provided by one or more wireless communication systems, such as a wireless fidelity (WiFi) hotspot connected with the network 150 and/or a wireless carrier system that can be implemented using various data processing equipment, communication towers, etc. Additionally or alternatively, network 150 may include a wired infrastructure (e.g., Ethernet).

The management server 110 may comprise one or more processors communicatively coupled to memory devices and input/output (I/O) devices. The management server 110 may include application 112. Application 112 may include logic implemented as computer instructions stored in one or more memories and executed by one or more processing devices of the management server 110. Application 112 may include logic for managing visualizations of portions of a network topology. Application 112 may include a discovery parameter identification component 114, a node management component 116, and a topology management component 118. The discovery parameter identification component 114 may include logic to receive and identify discovery parameters that may define the starting point for the discovery process, which types of nodes are to be discovered, the type of configuration information to be discovered, and the scope for discovering neighboring nodes using a maximum hop count.

Node management component 116 may include logic to manage a plurality of nodes that represent networked devices within a network. The node management component 116 may include logic to retrieve and store configuration properties for discovered nodes and to identify additional nodes for discovery.

The topology management component 118 may include logic to identify relationships between discovered nodes based upon common network configuration values and to generate a GUI representation of a network topology of the discovered nodes. For example, the topology management component 118 may identify a subset of discovered nodes that belong to the same VLAN. The topology management component 118 may generate the GUI representation of the network topology for the discovered nodes, which may include visual indicators that highlight each node of the subset of discovered nodes that belong to the identified VLAN.

The client device 120 may represent various computing devices such as personal computers (PCs), laptops, mobile phones, smart phones, tablet computers, network connected televisions, netbook computers etc. In some implementations, client device 120 may also be referred to as a "user device." The client device 120 may include client application 122. Client application 122 may include logic implemented as computer instructions stored in one or more memories and executed by one or more processing devices of the client device 120. Client application 122 may include a graphical user interface 128. The graphical user interface 128 may include logic to display the GUI representation of the network topology from the management server 110. The graphical user interface 128 may be configured to receive user input that may specify one or more changes to the network topology. User input may modify the zoom and/or position of the GUI representation in order to trigger a modification request to be sent to the management server 110.

In an implementation, the data store 130 may store network configuration information for each of the nodes discovered by the management server 110. The management server 110 may retrieve the network configuration information from the data store 130. The data store 130 may be a memory (e.g., random access memory), a cache, a drive (e.g., a hard drive), a flash drive, a database system, or another type of component or device capable of storing data.

The data store 130 may also include multiple storage components (e.g., multiple drives or multiple databases) that may also span multiple computing devices (e.g., multiple server computers). In an implementation, the collection of nodes 140 may represent the one or more networked devices within the network.

Figure 2:
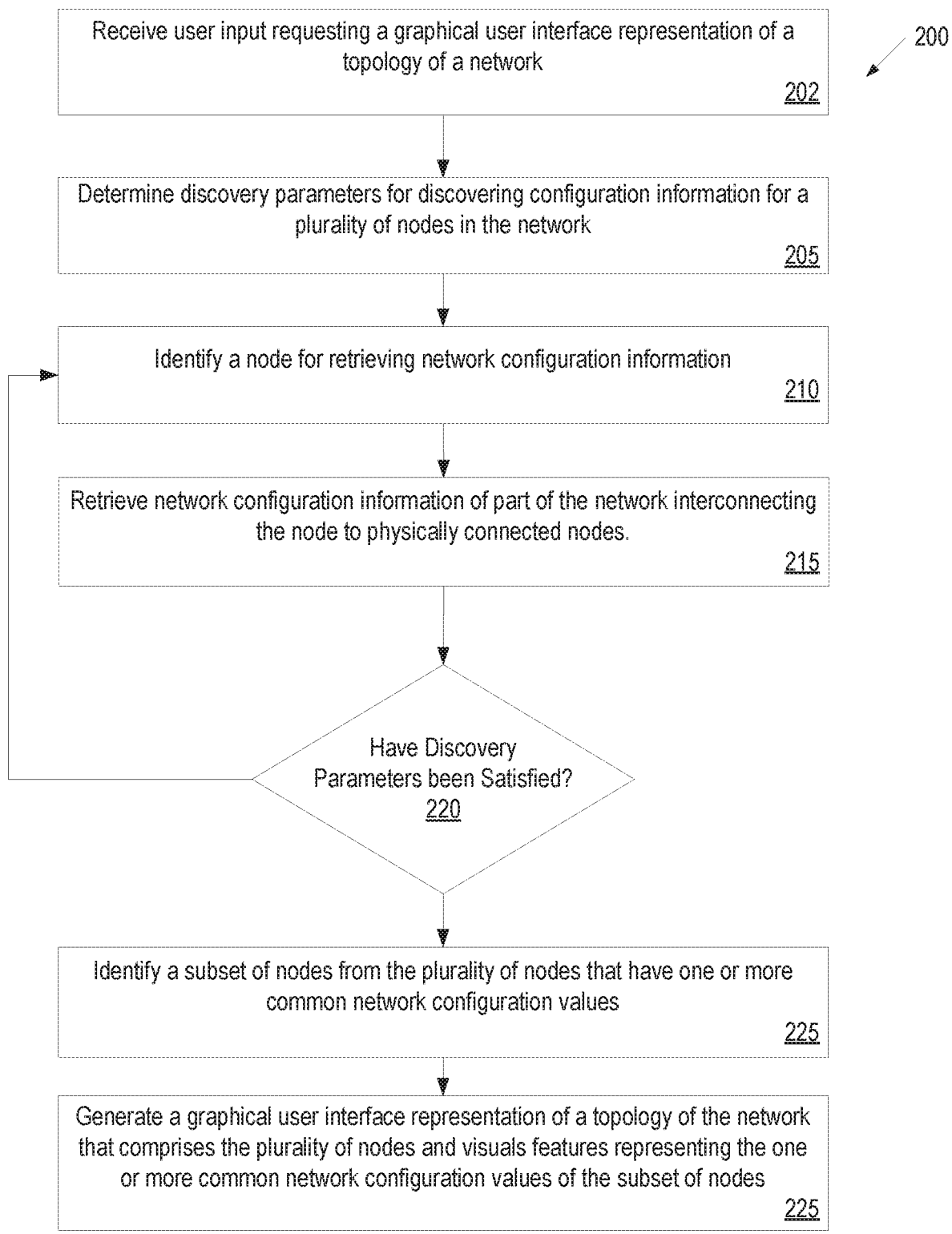
FIG. 2 depicts a flow diagram of an example method for identifying nodes from a plurality of nodes in a network that match discovery parameters and generating a graphical user interface representation of a topology of the network of identified nodes, in accordance with one or more aspects of the present disclosure.

FIG. 2 depicts a flow diagram of an example method for identifying nodes from a plurality of nodes in a network that match discovery parameters and generating a GUI representation of a topology of the network of identified nodes, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In one illustrative example, method 200 may be performed by application 112 of the management server 110. Alternatively, some or all of method 200 might be performed by other modules or machines.

At block 202, processing logic may receive, from a client device, user input requesting a GUI representation of a topology of a network. In an implementation, the discovery parameter identification component 114 of application 112 may receive, from the client device 120, user input specifying a request for the GUI representation of the topology of the network. The user input may specify parameters to be used to determine which nodes in the network are to be displayed within the GUI representation. The parameters may be discovery parameters for discovering configuration information of nodes in a network.

At block 205, processing logic may determine discovery parameters for discovering configuration information for the plurality of nodes in the network. In an implementation, the discovery parameter identification component 114 may receive, from the client device 120, the discovery parameters defining a first node for discovery and parameters specifying which types of nodes are to be discovered. For example, the discovery parameters may include device type information identifying specific types of nodes, such as routers, switches, servers, or any other specific networked device. Additionally, the discovery parameters may include model numbers or a set of model numbers to discover. For instance, the discovery parameters may specify that only Cisco® 4000 series routers are to be discovered. In other examples, the discovery parameters may specify types of nodes based upon their functions. For example, the discovery parameters may specify that only core routers, which are routers that route traffic between other routers, are to be discovered. In an implementation, the discovery parameters may include parameters defining a maximum hop count for the discovery process. As described, the maximum hop count may refer to the number of directly neighboring nodes along a network path, starting at a first node, which may be discovered before the discovery process terminates.

At block 210, processing logic may identify a node for retrieving network configuration information. In an implementation, the discovery parameter identification component 114 may identify a first node from the discovery parameters as a starting point for discovery. For example, if the management server 110 received a discovery request from the client device 120 that included discovery parameters, then in response to receiving the request, the discovery parameter identification component 114 may parse the received discovery parameters to identify the first node from the discovery parameters in the received request.

Figure 3A:
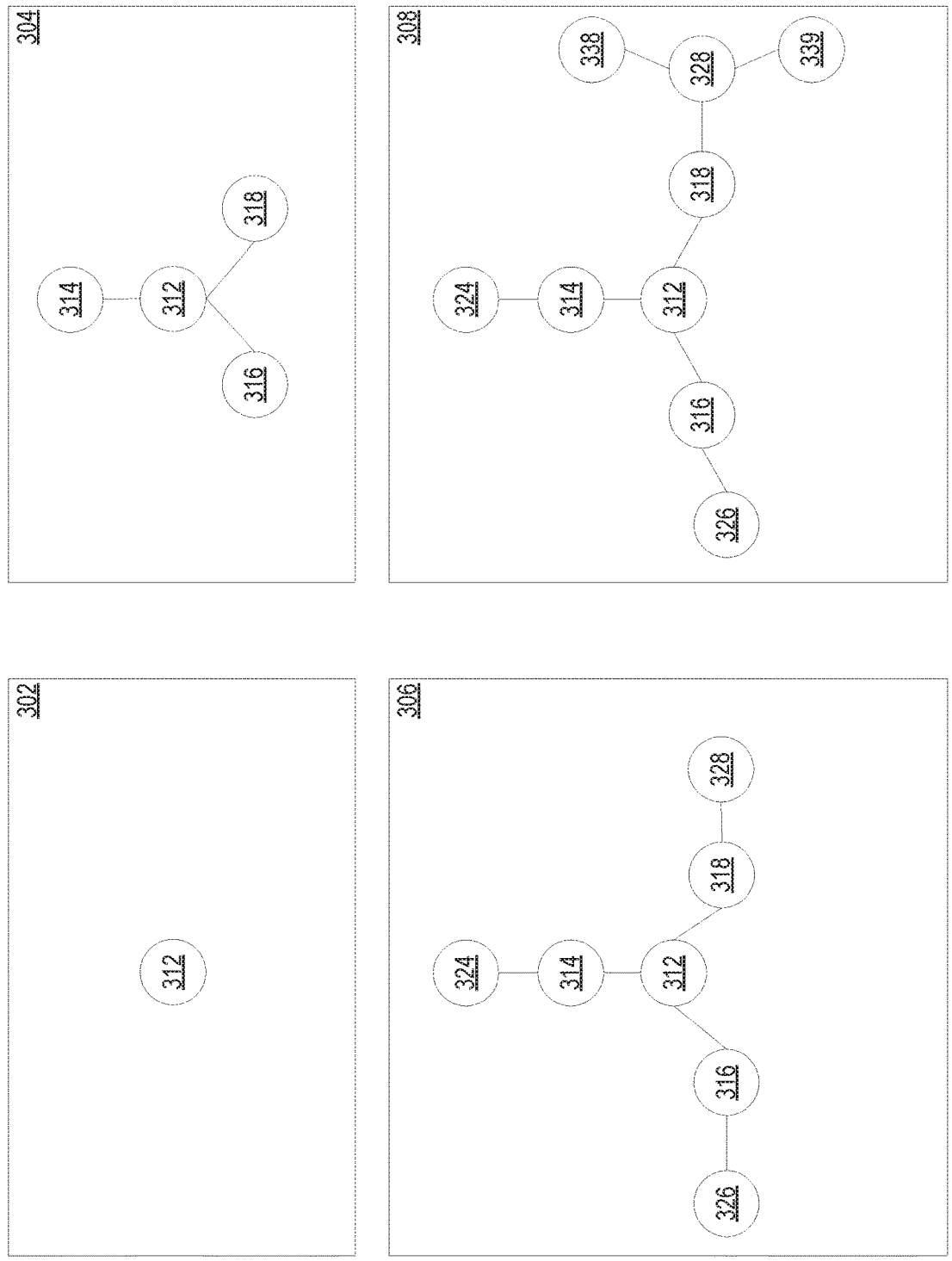
FIG. 3A depicts an illustrative example of discovering network configuration information from nodes, starting at a first node, in accordance with one or more aspects of the present disclosure.

At block 215, processing logic may retrieve network configuration information of a part of the network from the identified node. In an implementation, the node management component 114 may retrieve network configuration information from the identified node by establishing a connection to the node and executing one or more commands on the node to access the network configuration information. FIG. 3A depicts and illustrative example of discovering network configuration information from nodes, starting at the first node. Diagram 302 represents the discovery process starting with the first node, node 312, which was identified from the discovery parameters. In an example, the node management component 116 may connect to node 312 using credentials supplied in the discovery parameters. In another example, the application 112 may have previously stored login credentials within the data store 130. The node management component 116 may connect and login to node 312 using SSH or any other network protocol for establishing a connection with node 312. Upon establishing a connection, the node management component 116 may execute commands to discover network configuration information about node 312. For example, the node management component 116 may execute a "show lldp neighbors detail" command that returns as output the directly connected neighbors. The node management component 116 may save to the data store 130 the output from the lldp command as network configuration information for node 312. In another example, the node management component 116 may execute commands to access configuration information from configuration files, residing on node 312, to retrieve static network configuration information pertaining to one or more services and/or protocols enabled on node 312. In yet another example, the node management component 116 may execute query commands to retrieve current state information, such as network path information for OSPF or BGP protocols from a routing table or RIB. In an implementation, the retrieved network configuration information for each node may be stored within the data store 130. For example, generated data objects for each discovered node may contain attributes for each of the configuration values retrieved. In other examples, the data store 130 may implement a relational database with one or more tables storing information related to each discovered node. The stored network configuration information may be used when identifying common network configuration values between discovered nodes and for generating the GUI representation of the topology of the network.

At decision block 220, processing logic may determine whether the additional nodes are to be discovered based upon the discovery parameters. If the discovery parameters for device type and maximum hop count have been satisfied then processing logic may proceed to the phase of identifying nodes with common configuration values and generating a GUI representation of the network topology. In an implementation, the node management component 116 may determine that no additional nodes are to be discovered if the neighboring nodes identified from the retrieved network configuration information do not match the discovery parameters. For instance, if the discovery parameters specify that only routers are to be identified and the neighboring nodes to node 312 only include servers, personal computers, or networked devices other than routers, then the node management component 116 may conclude no additional nodes are to be discovered. Processing logic may then proceed to block 225 to identify subsets of discovered nodes that have common network configuration values. In another example, the node management component 116 may determine that no additional nodes are to be discovered if the maximum hop count from the discovery parameters has been reached. For example, if the maximum hop count is two and the current round of discovered nodes is two hops from the first node, then the node management component 116 may determine that no additional nodes are to be discovered.

If however, at decision block 220 processing logic determines that additional nodes are to be discovered, then the processing device proceeds to block 210 to identify a neighboring node for retrieving network configuration information. In an implementation, the node management component 116 may determine that additional nodes are to be discovered by determining that the maximum hop count has not been reached and by determining that neighboring nodes connected to the current node (node 312) match the discovery parameters.

Referring to block 210, the node management component 116 may identify a node from the retrieved network configuration information of node 312. For example referring to diagram 304 of FIG. 3, the node management component 116 may determine that the set of nodes 314, 316, and 318 each match the discovery parameters. The node management component 116 may then identify, for example, node 314 for retrieving network configuration information. At block 215, the node management component 116 may establish a connection to node 314 and retrieve network configuration information from node 314. At decision block 220, the node management component 116 may determine whether there are additional nodes to be discovered based on the discovery parameters and the network configuration information retrieved from node 314 as well as network configuration information from node 312. For example, the node management component 116 may determine that there are additional nodes connected to the node 314 that matches the discovery parameters. In this case, the node management component 116 may proceed back to block 210 to identify an additional node, such as node 324 depicted in diagram 306, and retrieve network configuration information for the node 324. In another example, the node management component 116 may also determine whether there are remaining neighbor nodes connected to node 312 that match the discovery parameters. Diagram 304 depicts that node 316 and node 318 are both directly connected to node 312 and match the discovery parameters. As such, the node management component 116 may then iterate through blocks 210-220 until all neighboring nodes that match the discovery parameters are identified and network configuration information for each identified node is retrieved.

Referring to diagram 306 and diagram 308, additional nodes that neighbor nodes 314, 316, and 318 may be discovered and network configuration information for each may be retrieved. Diagram 308 depicts the additional neighbor nodes that match the discovery parameters. The set of discovered nodes depicted include nodes (312, 314, 316, 318, 324, 326, 328, 338, and 339). Upon retrieving network configuration information for nodes that match the discovery parameters, at decision block 220 the processing device may determine that there are no additional nodes to discover and may proceed to block 225.

Figure 3B:
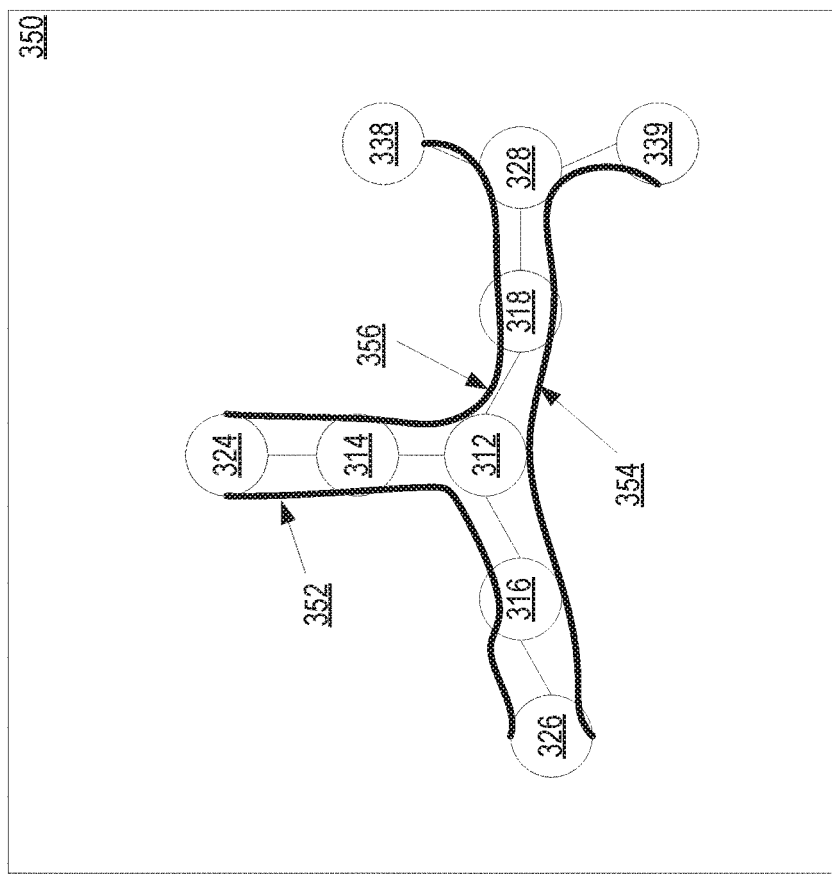
FIG. 3B depicts illustrative examples of subsets of nodes that have common configuration values represented with visual indicators indicating the subsets of nodes, in accordance with one or more aspects of the present disclosure.
Figure 3B:
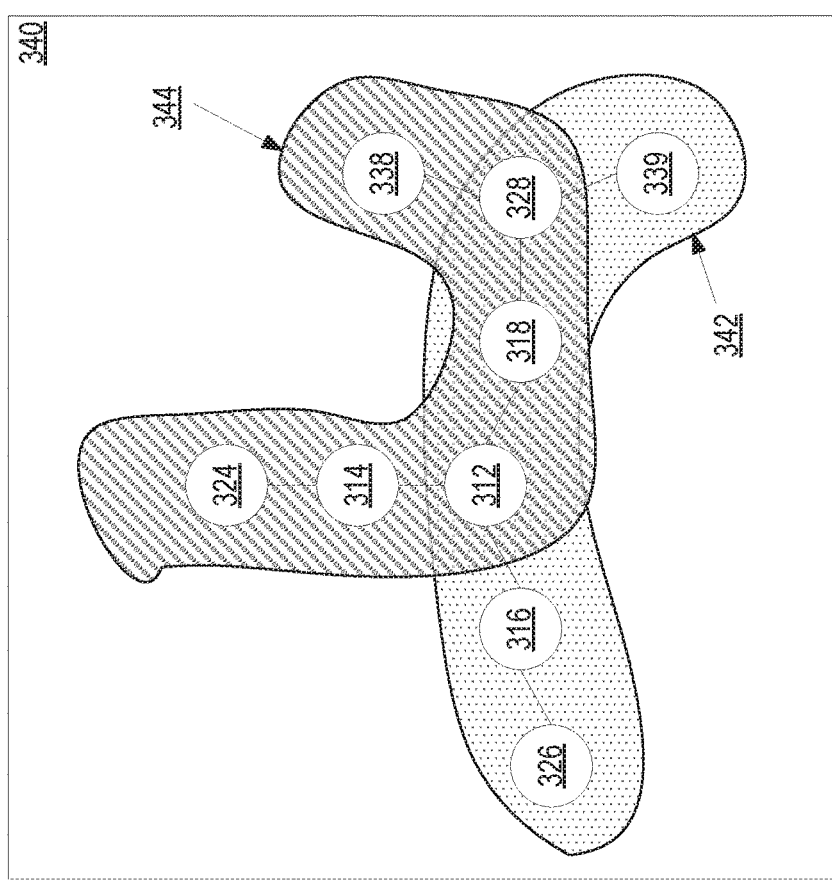

At block 225, processing logic may identify a subset of nodes that have one or more common network configuration values. In an implementation, the topology management component 118 may access the network configuration information for each of the discovered nodes from the data store 130 to determine relationships between nodes based on network protocols or enabled services. For example, the topology management component 118 may access the network addresses and subnet masks for discovered nodes to determine which nodes belong to the same VLAN. FIG. 3B depicts an illustrative example of subsets of nodes that have common configuration values represented with visual indicators indicating the subsets of nodes. Diagram 340 illustrates an example of two subsets of nodes that belong to two different VLANs. In diagram 340 nodes 312, 316, 326, 318, 328, and 339 belong to VLAN 342 and nodes 312, 314, 324, 318, 328, and 338 belong to VLAN 344.

In another example, the topology management component 118 may read from routing table information identifiers of nodes that make up a network path for packets to be routed from one node to another node. Diagram 350 illustrates network paths 352, 354, and 356 that contain specific nodes based upon routing table information retrieved from the discovered nodes. For instance, network path 352 includes nodes 326, 316, 312, 314, and 324. Network path 354 includes nodes 326, 316, 312, 318, 328, and 339. Network path 356 includes nodes 324, 314, 312, 318, 328, and 338. In yet other examples, the topology management component 118 may determine other relationships, not displayed in diagrams 340 and 350, based upon other network configuration information. Implementations of determining relationships between nodes based on network protocols or enabled services are not limited to determining VLANs and network paths based on routing table information. The topology management component 118 may determine relationships between nodes based upon several other properties including, but not limited to, physical connections, OSPF, BGP, virtual routing and forwarding instances (VRFs), determining network paths based on tunneling/port forwarding, and any other services or network protocols.

At block 230, processing logic may generate a GUI representation of the topology of the network that includes the plurality of discovered nodes and visual features representing the subset of nodes that have one or more common network configuration values. In an implementation, the topology management component 118 may generate the GUI representation of the topology of the network for the discovered nodes. The GUI representation of the topology may represent the discovered nodes as icons with text identifiers identifying the nodes using an assigned node name, MAC address, IP address, device type, or any other configurable identifier. The icons for the nodes may be specifically shaped or colored based upon the type of device or an assigned role for each device. For example, switches may be shaped as small switch icons, while servers may be shaped like small server racks.

In an implementation, the GUI representation may include visual features identifying nodes that belong to an identified subset, such as by highlighting nodes that belong to the same VLAN or overlaying a colored line to identify nodes belonging to a specific network path. Diagrams 340 and 350 of FIG. 3B illustrate examples of visual indicators used to identify subsets of nodes that have common network configuration values within the GUI representation. Diagram 340 displays an example of visual indicators highlighting nodes within VLAN 342 and VLAN 344. Diagram 350 displays an example of visual indicators as bolded lines that overlap nodes that belong to a specific network path based upon routing data.

Figure 4:
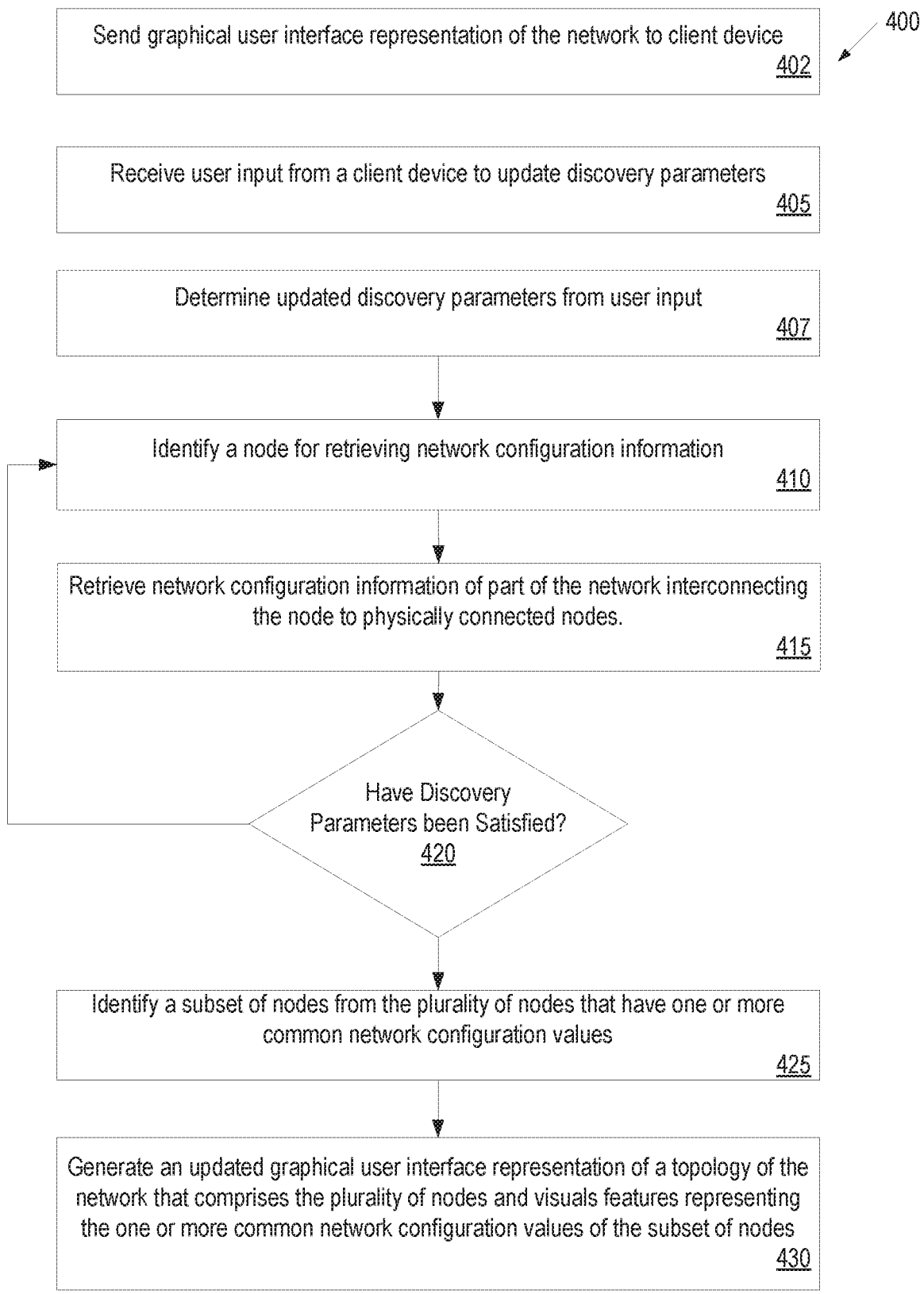
FIG. 4 depicts a flow diagram of an example method for receiving user input specifying a change in a view of a displayed graphical user interface representation of the network topology, in accordance with one or more aspects of the present disclosure.
Figure 5:
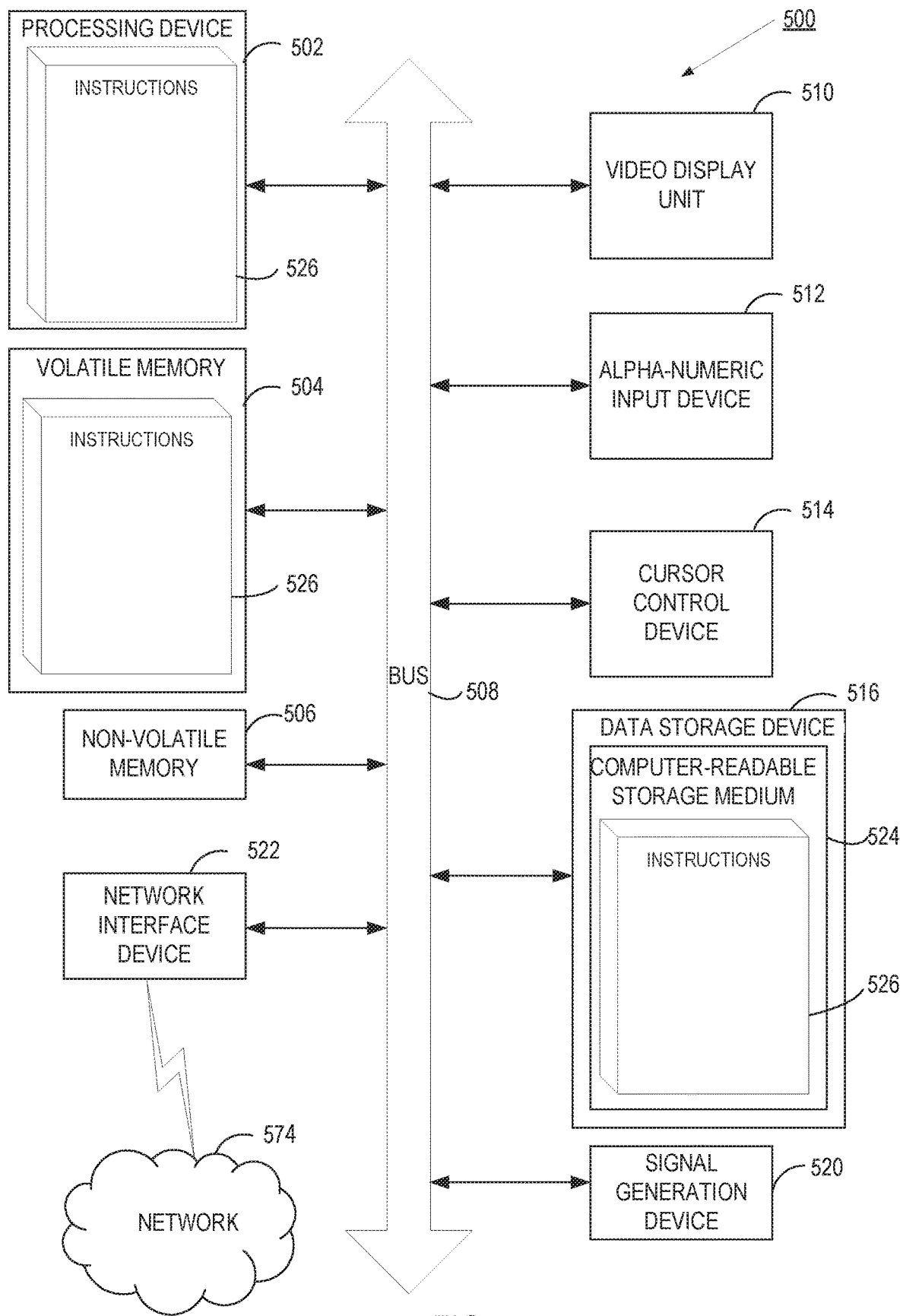
FIG. 5 depicts a block diagram of an illustrative computing device operating in accordance with the examples of the disclosure.

In an implementation, application 112 may be configured to send the GUI representation of the network topology to the client device 120 for display on a display screen coupled to the client device 120. FIG. 4 depicts a flow diagram of an example method for receiving user input specifying a change in the view of the displayed GUI representation of the network topology, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In one illustrative example, method 400 may be performed by application 112 of the management server 110. Alternatively, some or all of method 400 might be performed by other modules or machines.

At block 402, processing logic may send the GUI representation of the network topology to a client device. In an implementation, the application 112 may send the GUI representation of the network topology, generated by the topology management component 118, to the client device 120 for display within a graphical user interface of the client device 120.

The client device 120 may receive the GUI representation of the network topology and may display the topology in the client application 122. The client application 122 may implement a graphical user interface 128 for displaying the GUI representation of the network topology. The graphical user interface 128 may be configured to provide selectable filter controls configured to modify the display of the visual indicators associated with the GUI representation of the network topology. For example, the filters may toggle VLAN indicators or network path indicators to remove or display the detected VLANs or the network paths from view.

FIG. 3B depicts an example of the GUI representation as it would be displayed within the graphical user interface 128 if the VLANs filter has been selected by a user. Within diagram 340, VLAN 344 may display a highlighted boundary around nodes that belong to VLAN 344. Similarly, VLAN 342 may display a differently colored boundary around nodes that belong to VLAN 344. The graphical user interface 128 may be configured to allow the user to select and deselect filters in order to display different node relationships based on different configuration properties. Additionally, the filters on the graphical user interface 128 may be configured to display network relationships of nodes based upon a specific OSI layer. For instance, the user may select a filter that displays only OSI layer 3 node relationships, such as OSPF and/or BGP node groups. The OSI layer 3 filter may also hide relationships between nodes based on other OSI layers, such as hiding physical connection links between nodes (OSI layer 1).

Referring to FIG. 4, at block 405, processing logic may receive user input from the client device 110 to update discovery parameters for a discovery request. In an implementation, the discovery parameter identification component 114 of application 112 may receive, from the client device 120, user input specifying updates to existing discovery parameters.

At block 407, processing logic may determine updated discovery parameters from the received user input from the client device. In an implementation, the discovery parameter identification component 114 may determine the updated discovery parameters from the received user input. The updates may specifically define new parameters such as, a new starting node, a new maximum hop count, and/or updated device types and roles for discovered nodes. For example, a user may select a node displayed in the graphical representation of the network for the purpose of designating the node as the new starting node. The user input received from the client device 120 may include the newly selected starting node. In other examples, the user may specify, via the graphical user interface 128 which types of devices and/or roles to be included in the updated discovery request.

In yet other examples, the received user input may specify changes to the viewable area on the graphical user interface 128, which the discovery parameter identification component 114 may then use to determine updated discovery parameters. For instance, if the user of the graphical user interface 128 pans the viewable area to the left, thereby shifting the locations of the displayed nodes, then the graphical user interface 128 may send the user input to the application 112 specifying the number of pixels each node has shifted. The discovery parameter identification component 114 may then determine based on the shifting locations of the nodes, which node is located closest to the center of the viewable area. The discovery parameter identification component 114 may determine a third node based on which node is closest to the center of the viewable area.

In an implementation the discovery parameter identification component 114 may determine an updated maximum hop count based on the received user input from the client device 120. For example, if the received user input specifies that the user zoomed in, then discovery parameter identification component 114 may decrease the maximum hop count as nodes in the viewable area in the graphical user interface 128 have become bigger and less neighboring nodes would be visible. The interactive zoom control may have a slider bar for changing the zoom. A slider bar value associated with the zoom amount may then be sent to the application 112 specifying the amount of zoom. Based on the slider bar value of the zoom, the discovery parameter identification component 114 may adjust the maximum hop count accordingly. For example, if the slider bar value indicates the viewable area is fully zoomed in, then the discovery parameter identification component 114 may set the maximum hop count to one, such that only directly connected neighbor nodes would be visible. In contrast, if the slider bar value indicates that the viewable area is fully zoomed out, then the discovery parameter identification component 114 may set the maximum hop count to a higher number, such as 10. The maximum value for the maximum hop count may be configured based upon the number of total nodes in the network, or some other configurable value specified by the application 112 or by a user such as a network engineer.

Blocks 410-430 of method 400 are substantially similar to blocks 210-230 of method 200. At block 410, processing logic identifies a node for retrieving network configuration information. In an implementation, the discovery parameter identification component 114 may identify a first node from the updated discovery parameters determined at block 407.

In another implementation, the node management component 114 may identify the node for retrieving network configuration information from previously retrieved network configuration information of a previously identified node. For instance, if at decision block 420 the node management component 116 determines that additional network configuration information is to be retrieved from a neighboring node of the currently identified node, then the node management component 114 may identify a node from the previously retrieved network configuration information.

At block 415, processing logic may retrieve network configuration information of a part of the network from the identified node. In an implementation, the node management component 114 may retrieve network configuration information from the identified node by establishing a connection to the node and executing one or more commands on the node to access the network configuration information.

In another implementation, the node management component 114 may access the data store 130 for network configuration information that may have been previously stored during a prior discovery of the node. For example, if network configuration information for node 314 was previously retrieved and stored in the data store 130, then the node management component 114 may access the data store 130 to retrieve the configuration information without having to reconnect to node 314 and execute query commands to retrieve configuration information. Previously stored network configuration information stored in the data store 130 may be used if the data values are still valid. Data values for configuration information may change over time, for instance routing information, and therefore data stored within the data store 130 may expire after a certain period of time. If the data on the data store 130 has expired then the node management component 114 may retrieve network configuration information from the identified node.

At decision block 420, processing logic may determine whether the additional nodes are to be discovered. In an implementation, if the node management component 116 determines that no additional nodes are to be discovered, based upon updated discovery parameters and neighboring nodes determined from the retrieved network configuration information from block 415, then the node management component 116 may proceed to block 425 to identify subsets of discovered nodes that have common network configuration values. If at decision block 420 the node management component 116 determines that additional nodes are to be discovered, then the node management component 116 proceeds to block 410 to identify the next node for discovery.

At block 425, processing logic may identify a subset of nodes that have one or more common network configuration values. In an implementation, the topology management component 118 may access the network configuration information for each of the discovered nodes from the data store 130 to determine relationships between nodes based on network protocols or enabled services.

At block 430, processing logic may generate an updated GUI representation of the topology of the network that includes the plurality of discovered nodes and visual features representing the subset of nodes that have one or more common network configuration values. In an implementation, the topology management component 118 may generate the updated GUI representation of the topology of the network for the discovered nodes including visual features identifying nodes that belong to identified subsets determined at block 425.

In an implementation, the topology management component 118 may determine the level of detail to be displayed within the updated GUI representation of the topology of the network based upon the zoom level provided in the user input received at block 402. For example, if the zoom level fully zoomed out, then the topology management component 118 may, when displaying physical connections related to OSI layer 1, device names and device types for nodes. When the zoom level is partially zoomed in, then the topology management component 118 may display LLDP links and interface names for OSI layer 1. When the zoom level is fully zoomed in, then the topology management component 118 may, for OSI layer 1, display electrical, optical, and/or wireless link types for nodes, hardware part numbers, hardware status, and transmission modes for nodes.

Examples for OSI layer 2 displays may include displaying, when the zoom level is partially zoomed in, link layer protocols and which VLANs are enabled for links and interfaces for each node. When the zoom level is fully zoomed in, then the topology management component 118 may display frame counters, frame counters per VLAN, and MAC table entries.

Examples for OSI layer 3 displays may include displaying, when the zoom level is fully zoomed out, BGP autonomous system numbers, OSPF area numbers, and/or loopback IP addresses. When the zoom level is partially zoomed in, then the topology management component 118 may display BGP neighbor adjacency states, OSPF neighbor adjacency states, and interface IP addresses. When the zoom level is fully zoomed in, then the topology management component 118 may display routing table entries, and access lists for nodes.

Upon generating the updated graphical representation of the topology of the network, the application 112 may send the GUI representation of the network topology to the client device 120 for display on the graphical user interface 128.

FIG. 13 depicts a block diagram of a computer system operating in accordance with one or more aspects of the disclosure. In various illustrative examples, computer system 500 may correspond to computing devices, such as client device 120, management server 110, and deployment server 130 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for application 112 and client application 122 of FIG. 1 for implementing methods 200, 400, 800, and 1000.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: receiving, by a processor, user input requesting a graphical user interface representation of a topology of a network, wherein the user input comprises a zoom level for displaying graphical user interface representation; determining, from the user input, discovery parameters for discovering configuration information for a plurality of nodes in the network, the discovery parameters comprising a hop count determined in view of the zoom level, wherein the hop count is a maximum number of hops between a first node and a destination node of the plurality of nodes; retrieving, from the first node of the plurality of nodes specified by the discovery parameters, a first network configuration information of a first part of the network interconnecting the first node to a first subset of the plurality of nodes, wherein the first subset of the plurality of nodes has property values matching the discovery parameters; identifying a second node from the first subset of the plurality of nodes; retrieving, from the second node, a second network configuration information of a second part of the network interconnecting the second node to a second subset of the plurality of nodes; and generating a graphical user interface representation of a topology of the network, wherein the graphical user interface representation comprises the first node, the first subset of the plurality of nodes, and the second subset of the plurality of nodes.

Example 2 is the method of example 1, further comprising: identifying among the first node, the first subset of the plurality of nodes, and the second subset of the plurality of nodes, a subset of nodes that have common network configuration values, wherein the graphical user interface representation comprises a visual feature representing the common network configuration values of the subset of nodes.

Example 3 is the method of example 1, wherein the discovery parameters comprise at least one of a device type of nodes to be discovered and a function assigned to the nodes to be discovered.

Example 4 is the method of example 1, wherein retrieving the first network configuration information of the first part of the network comprises: sending a discovery request to the first node for the first network configuration information identifying connectivity between the first node and the first subset of the plurality of nodes; and receiving, from the first node, the first network configuration information, wherein the first network configuration information comprises at least one of network addresses, communication endpoint identifiers for physical connections between the first node and the first subset of the plurality of nodes, and media access control address (MAC) identifiers for the first node and the first subset of the plurality of nodes.

Example 5 is the method of example 1, wherein retrieving the first network configuration information of the first part of the network comprises: sending a discovery request to the first node for the first network configuration information identifying configuration values for one or more enabled networking protocols for the first node; and receiving, from the first node, the first network configuration information from one or more network configuration files on the first node that identify the configuration values for the one or more enabled networking services for the first node.

Example 6 is the method of example 1, wherein retrieving the first network configuration information of the first part of the network comprises: sending a discovery request to the first node for the first network configuration information identifying one or more network routes between the first node and at least one of the plurality of nodes; and receiving, from the first node, the first network configuration information from at least one of a routing table, routing information base, and a routing protocol database on the first node that describe network routes between the first node and at least one of the plurality of nodes.

Example 7 is the method of example 1, further comprising: identifying a third node from the second subset of the plurality of nodes with property values matching the discovery parameters; retrieving, from the third node, a third network configuration information of a third part of the network interconnecting the third node to a third subset of the plurality of nodes; and wherein generating the graphical user interface representation of the topology of the network comprises, generating the graphical user interface representation that comprises the first node, the first subset of the plurality of nodes, the second subset of the plurality of nodes, and the third subset of the plurality of nodes.

Example 8 is the method of example 1, further comprising: sending the graphical user interface representation of the topology of the network to a client device to be displayed within a graphical user interface of the client device; receiving, from the client device, user input specifying a change in view of the graphical user interface displaying the graphical user interface representation of the topology of the network, wherein the change in view comprises at least one of a zoom, pan, or vertical shift; determining updated discovery parameters based upon the user input from the client device; retrieving, from a third node, an updated first network configuration information of an updated first part of the network interconnecting the third node to a third subset of the plurality of nodes; identifying a fourth node from the third subset of the plurality of nodes with property values matching the updated discovery parameters; retrieving, from the fourth node, an updated second network configuration information of an updated second part of the network interconnecting the fourth node to a fourth subset of the plurality of nodes; identifying among the third node, the third subset of the plurality of nodes, and the fourth subset of the plurality of nodes, an updated subset of nodes that have common network configuration values; and generating an updated graphical user interface representation of the topology of the network, wherein the updated graphical user interface representation comprises the third node, the third subset of the plurality of nodes, the fourth subset of the plurality of nodes, and a new visual feature representing the common network configuration values of the updated subset of nodes.

Example 9 is a system comprising: a memory; and a processor operatively coupled to the memory, to: receive, user input requesting a graphical user interface representation of a topology of a network, wherein the user input comprises a device type of nodes to be displayed within the graphical user interface representation; determine, from the user input, discovery parameters for discovering configuration information of a network interconnecting a plurality of nodes in the network, the discovery parameters comprising the device type of nodes to be displayed; retrieve, from a first node of the plurality of nodes specified by the discovery parameters, a first network configuration information of a first part of the network interconnecting the first node to a first subset of the plurality of nodes, wherein the first subset of the plurality of nodes has property values matching the discovery parameters; identify a second node from the first subset of plurality of nodes; retrieve, from the second node, a second network configuration information of a second part of the network interconnecting the second node to a second subset of the plurality of nodes; and generate a graphical user interface representation of a topology of the network, wherein the graphical user interface representation comprises the first node, the first subset of the plurality of nodes, and the second subset of the plurality of nodes.

Example 10 is the system of example 9, wherein processor is further to: identify among the first node, the first subset of the plurality of nodes, and the second subset of the plurality of nodes, a subset of nodes that have common network configuration values, wherein the graphical user interface representation comprises a visual feature representing the common network configuration values of the subset of nodes.

Example 11 is the system of example 9, wherein to retrieve the first network configuration information of the first part of the network, the processor is to: send a discovery request to the first node for the first network configuration information identifying connectivity between the first node and the first subset of the plurality of nodes; and receive, from the first node, the first network configuration information, wherein the first network configuration information comprises at least one of network addresses, communication endpoint identifiers for physical connections between the first node and the first subset of the plurality of nodes, and media access control address (MAC) identifiers for the first node and the first subset of the plurality of nodes.

Example 12 is the system of example 9, wherein to retrieve the first network configuration information of the first part of the network, the processor is to: send a discovery request to the first node for the first network configuration information identifying configuration values for one or more enabled networking services for the first node; and receive, from the first node, the first network configuration information from one or more network configuration files on the first node that identify the configuration values for the one or more enabled networking services for the first node.

Example 13 is the system of example 9, wherein to retrieve the first network configuration information of the first part of the network, the processor is to: send a discovery request to the first node for the first network configuration information identifying one or more network routes between the first node and at least one of the plurality of nodes; and receive, from the first node, the first network configuration information from at least one of a routing table, routing information base, and a routing protocol database on the first node that describe network routes between the first node and at least one of the plurality of nodes.

Example 14 is the system of example 9, wherein the processor is further to: identify a third node from the second subset of the plurality of nodes with property values matching the discovery parameters; retrieve, from the third node, a third network configuration information of a third part of the network interconnecting the third node to a third subset of the plurality of nodes; and wherein to generate the graphical user interface representation of the topology of the network comprises, to generate the graphical user interface representation that comprises the first node, the first subset of the plurality of nodes, the second subset of the plurality of nodes, and the third subset of the plurality of nodes.

Example 15 is the system of example 9, wherein the processor is further to: send the graphical user interface representation of the topology of the network to a client device to be displayed within a graphical user interface of the client device; receiving, from the client device, user input specifying a change in view of the graphical user interface displaying the graphical user interface representation of the topology of the network, wherein the change in view comprises at least one of a zoom, pan, or vertical shift; determine updated discovery parameters based upon the user input from the client device; retrieve, from a third node, an updated first network configuration information of an updated first part of the network interconnecting the third node to a third subset of the plurality of nodes; identify a fourth node from the third subset of the plurality of nodes with property values matching the updated discovery parameters; retrieve, from the fourth node, an updated second network configuration information of an updated second part of the network interconnecting the fourth node to a fourth subset of the plurality of nodes; identify among the third node, the third subset of the plurality of nodes, and the fourth subset of the plurality of nodes, an updated subset of nodes that have common network configuration values; and generate an updated graphical user interface representation of the topology of the network, wherein the updated graphical user interface representation comprises the third node, the third subset of the plurality of nodes, the fourth subset of the plurality of nodes, and a new visual feature representing the common network configuration values of the updated subset of nodes.

Example 16 is a non-transitory computer readable storage medium, having instructions stored therein, which when executed by a processing device of a computer system, cause the processing device to: receive, user input requesting a graphical user interface representation of a topology of a network, wherein the user input comprises a device type of nodes to be displayed within the graphical user interface representation; determine, from the user input, discovery parameters for discovering configuration information of a network interconnecting a plurality of nodes in the network, the discovery parameters comprising the device type of nodes to be displayed; retrieve, from a first node of the plurality of nodes specified by the discovery parameters, a first network configuration information of a first part of the network interconnecting the first node to a first subset of the plurality of nodes, wherein the first subset of the plurality of nodes has property values matching the discovery parameters; identify a second node from the first subset of the plurality of nodes; retrieve, from the second node, a second network configuration information of a second part of the network interconnecting the second node to a second subset of the plurality of nodes; and generate a graphical user interface representation of a topology of the network, wherein the graphical user interface representation comprises the first node, the first subset of the plurality of nodes, and the second subset of the plurality of nodes.

Example 17 is the non-transitory computer readable storage medium of example 16, wherein the processing device is further to: identify among the first node, the first subset of the plurality of nodes, and the second subset of the plurality of nodes, a subset of nodes that have common network configuration values, wherein the graphical user interface representation comprises a visual feature representing the common network configuration values of the subset of nodes.

Example 18 is the non-transitory computer readable storage medium of example 16, wherein to retrieve the first network configuration information of the first part of the network, the processing device is to: send a discovery request to the first node for the first network configuration information identifying connectivity between the first node and the first subset of the plurality of nodes; and receive, from the first node, the first network configuration information, wherein the first network configuration information comprises at least one of network addresses, communication endpoint identifiers for physical connections between the first node and the first subset of the plurality of nodes, and media access control address (MAC) identifiers for the first node and the first subset of the plurality of nodes.

Example 19 is the non-transitory computer readable storage medium of example 16, wherein to retrieve the first network configuration information of the first part of the network, the processing device is to: send a discovery request to the first node for the first network configuration information identifying configuration values for one or more enabled networking services for the first node; and receive, from the first node, the first network configuration information from one or more network configuration files on the first node that identify the configuration values for the one or more enabled networking services for the first node.

Example 20 is the non-transitory computer readable storage medium of example 16, wherein to retrieve the first network configuration information of the first part of the network, the processing device is to: send a discovery request to the first node for the first network configuration information identifying one or more network routes between the first node and at least one of the plurality of nodes; and receive, from the first node, the first network configuration information from at least one of a routing table, routing information base, and a routing protocol database on the first node that describe network routes between the first node and at least one of the plurality of nodes.

What is claimed is:

1. A method comprising:
    receiving, by a processor, user input requesting a graphical user interface representation of a topology of a network, wherein the user input comprises discovery parameters specifying a plurality of nodes to be displayed, wherein the discovery parameters comprise a hop count defining a maximum number of hops between a first node and a destination node of a plurality of nodes;
    determining, in view of the discovery parameters, configuration information for the plurality of nodes;
    retrieving, from the first node of the plurality of nodes specified by the discovery parameters, a first network configuration information of a first part of the network interconnecting the first node to a first subset of the plurality of nodes, wherein the first subset of the plurality of nodes has property values matching the discovery parameters;
    identifying a second node from the first subset of the plurality of nodes;
    retrieving, from the second node, a second network configuration information of a second part of the network interconnecting the second node to a second subset of the plurality of nodes;
    identifying among the first node, the first subset of the plurality of nodes, and the second subset of the plurality of nodes, a group of nodes that have common network configuration values; and
    generating a graphical user interface representation of a topology of the network, wherein the graphical user interface representation comprises the first node, a first visual feature representing the first subset of the plurality of nodes, a second visual feature representing the second subset of the plurality of nodes, and a third visual feature representing the common network configuration values of the group of nodes.

2. The method of claim 1, wherein the discovery parameters comprise at least one of a device type of nodes to be discovered and a function assigned to the nodes to be discovered.

3. The method of claim 1, wherein retrieving the first network configuration information of the first part of the network comprises:
    sending a discovery request to the first node for the first network configuration information identifying connectivity between the first node and the first subset of the plurality of nodes; and
    receiving, from the first node, the first network configuration information, wherein the first network configuration information comprises at least one of network addresses, communication endpoint identifiers for physical connections between the first node and the first subset of the plurality of nodes, and media access control address (MAC) identifiers for the first node and the first subset of the plurality of nodes.

4. The method of claim 1, wherein retrieving the first network configuration information of the first part of the network comprises:
    sending a discovery request to the first node for the first network configuration information identifying configuration values for one or more enabled networking protocols for the first node; and
    receiving, from the first node, the first network configuration information from one or more network configuration files on the first node that identify the configuration values for the one or more enabled networking services for the first node.

5. The method of claim 1, wherein retrieving the first network configuration information of the first part of the network comprises:
    sending a discovery request to the first node for the first network configuration information identifying one or more network routes between the first node and at least one of the plurality of nodes; and
    receiving, from the first node, the first network configuration information from at least one of a routing table, routing information base, and a routing protocol database on the first node that describe network routes between the first node and at least one of the plurality of nodes.

6. The method of claim 1, further comprising:
identifying a third node from the second subset of the plurality of nodes with property values matching the discovery parameters;
retrieving, from the third node, a third network configuration information of a third part of the network interconnecting the third node to a third subset of the plurality of nodes; and
wherein generating the graphical user interface representation of the topology of the network comprises, generating the graphical user interface representation that comprises the first node, the first subset of the plurality of nodes, the second subset of the plurality of nodes, and the third subset of the plurality of nodes.

7. The method of claim 1, further comprising:
sending the graphical user interface representation of the topology of the network to a client device to be displayed within a graphical user interface of the client device;
receiving, from the client device, user input specifying a change in view of the graphical user interface displaying the graphical user interface representation of the topology of the network, wherein the change in view comprises at least one of a zoom, pan, or vertical shift;
determining updated discovery parameters based upon the user input from the client device;
retrieving, from a third node, an updated first network configuration information of an updated first part of the network interconnecting the third node to a third subset of the plurality of nodes;
identifying a fourth node from the third subset of the plurality of nodes with property values matching the updated discovery parameters;
retrieving, from the fourth node, an updated second network configuration information of an updated second part of the network interconnecting the fourth node to a fourth subset of the plurality of nodes;
identifying among the third node, the third subset of the plurality of nodes, and the fourth subset of the plurality of nodes, an updated subset of nodes that have common network configuration values; and
generating an updated graphical user interface representation of the topology of the network, wherein the updated graphical user interface representation comprises the third node, the third subset of the plurality of nodes, the fourth subset of the plurality of nodes, and a new visual feature representing the common network configuration values of the updated subset of nodes.

8. A system comprising:
a memory; and
a processor operatively coupled to the memory, to:
receive, user input requesting a graphical user interface representation of a topology of a network, wherein the user input comprises discovery parameters specifying a plurality of nodes to be displayed, wherein the discovery parameters comprise a device type of nodes to be displayed within the graphical user interface representation;
determine, in view of the discovery parameters, configuration information of a network interconnecting a plurality of nodes in the network;
retrieve, from a first node of the plurality of nodes specified by the discovery parameters, a first network configuration information of a first part of the network interconnecting the first node to a first subset of the plurality of nodes, wherein the first subset of the plurality of nodes has property values matching the discovery parameters;
identify a second node from the first subset of the plurality of nodes;
retrieve, from the second node, a second network configuration information of a second part of the network interconnecting the second node to a second subset of the plurality of nodes;
identify among the first node, the first subset of the plurality of nodes, and the second subset of the plurality of nodes, a group of nodes that have common network configuration values; and
generate a graphical user interface representation of a topology of the network, wherein the graphical user interface representation comprises the first node, a first visual feature representing the first subset of the plurality of nodes, a second visual feature representing the second subset of the plurality of nodes, and a third visual feature representing the common network configuration values of the group of nodes.

9. The system of claim 8, wherein to retrieve the first network configuration information of the first part of the network, the processor is to:
send a discovery request to the first node for the first network configuration information identifying connectivity between the first node and the first subset of the plurality of nodes; and
receive, from the first node, the first network configuration information, wherein the first network configuration information comprises at least one of network addresses, communication endpoint identifiers for physical connections between the first node and the first subset of the plurality of nodes, and media access control address (MAC) identifiers for the first node and the first subset of the plurality of nodes.

10. The system of claim 8, wherein to retrieve the first network configuration information of the first part of the network, the processor is to:
send a discovery request to the first node for the first network configuration information identifying configuration values for one or more enabled networking services for the first node; and
receive, from the first node, the first network configuration information from one or more network configuration files on the first node that identify the configuration values for the one or more enabled networking services for the first node.

11. The system of claim 8, wherein to retrieve the first network configuration information of the first part of the network, the processor is to:
send a discovery request to the first node for the first network configuration information identifying one or more network routes between the first node and at least one of the plurality of nodes; and
receive, from the first node, the first network configuration information from at least one of a routing table, routing information base, and a routing protocol database on the first node that describe network routes between the first node and at least one of the plurality of nodes.

12. The system of claim 8, wherein the processor is further to:
identify a third node from the second subset of the plurality of nodes with property values matching the discovery parameters;

retrieve, from the third node, a third network configuration information of a third part of the network interconnecting the third node to a third subset of the plurality of nodes; and wherein to generate the graphical user interface representation of the topology of the network comprises, to generate the graphical user interface representation that comprises the first node, the first subset of the plurality of nodes, the second subset of the plurality of nodes, and the third subset of the plurality of nodes.

13. The system of claim 8, wherein the processor is further to:

send the graphical user interface representation of the topology of the network to a client device to be displayed within a graphical user interface of the client device;

receiving, from the client device, user input specifying a change in view of the graphical user interface displaying the graphical user interface representation of the topology of the network, wherein the change in view comprises at least one of a zoom, pan, or vertical shift;

determine updated discovery parameters based upon the user input from the client device;

retrieve, from a third node, an updated first network configuration information of an updated first part of the network interconnecting the third node to a third subset of the plurality of nodes;

identify a fourth node from the third subset of the plurality of nodes with property values matching the updated discovery parameters;

retrieve, from the fourth node, an updated second network configuration information of an updated second part of the network interconnecting the fourth node to a fourth subset of the plurality of nodes;

identify among the third node, the third subset of the plurality of nodes, and the fourth subset of the plurality of nodes, an updated subset of nodes that have common network configuration values; and generate an updated graphical user interface representation of the topology of the network, wherein the updated graphical user interface representation comprises the third node, the third subset of the plurality of nodes, the fourth subset of the plurality of nodes, and a new visual feature representing the common network configuration values of the updated subset of nodes.

14. A non-transitory computer readable storage medium, having instructions stored therein, which when executed by a processing device of a computer system, cause the processing device to:

receive, user input requesting a graphical user interface representation of a topology of a network, wherein the user input comprises discovery parameters specifying a plurality of nodes to be displayed, wherein the discovery parameters comprise a device type of nodes to be displayed within the graphical user interface representation;

determine, in view of the discovery parameters configuration information of a network interconnecting a plurality of nodes in the network;

retrieve, from a first node of the plurality of nodes specified by the discovery parameters, a first network configuration information of a first part of the network interconnecting the first node to a first subset of the plurality of nodes, wherein the first subset of the plurality of nodes has property values matching the discovery parameters;

identify a second node from the first subset of the plurality of nodes;

retrieve, from the second node, a second network configuration information of a second part of the network interconnecting the second node to a second subset of the plurality of nodes;

identify among the first node, the first subset of the plurality of nodes, and the second subset of the plurality of nodes, a group of nodes that have common network configuration values, and generate a graphical user interface representation of a topology of the network, wherein the graphical user interface representation comprises the first node, a first visual feature representing the first subset of the plurality of nodes, a second visual feature representing the second subset of the plurality of nodes, and a third visual feature representing the common network configuration values of the group of nodes.

15. The non-transitory computer readable storage medium of claim 14, wherein to retrieve the first network configuration information of the first part of the network, the processing device is to:

send a discovery request to the first node for the first network configuration information identifying connectivity between the first node and the first subset of the plurality of nodes; and receive, from the first node, the first network configuration information, wherein the first network configuration information comprises at least one of network addresses, communication endpoint identifiers for physical connections between the first node and the first subset of the plurality of nodes, and media access control address (MAC) identifiers for the first node and the first subset of the plurality of nodes.

16. The non-transitory computer readable storage medium of claim 14, wherein to retrieve the first network configuration information of the first part of the network, the processing device is to:

send a discovery request to the first node for the first network configuration information identifying configuration values for one or more enabled networking services for the first node; and receive, from the first node, the first network configuration information from one or more network configuration files on the first node that identify the configuration values for the one or more enabled networking services for the first node.

17. The non-transitory computer readable storage medium of claim 14, wherein to retrieve the first network configuration information of the first part of the network, the processing device is to:

send a discovery request to the first node for the first network configuration information identifying one or more network routes between the first node and at least one of the plurality of nodes; and receive, from the first node, the first network configuration information from at least one of a routing table, routing information base, and a routing protocol database on the first node that describe network routes between the first node and at least one of the plurality of nodes.

* * * * *